United States Patent
Kim et al.

(10) Patent No.: US 10,635,178 B2
(45) Date of Patent: Apr. 28, 2020

(54) MULTI-DIRECTIONAL ACTUATING MODULE

(71) Applicant: CK MATERIALS LAB CO., LTD., Guro-gu, Seoul (KR)

(72) Inventors: Hyeong Jun Kim, Seoul (KR); Jong Hun Lee, Seoul (KR); Nam Seok Kim, Seoul (KR); Myung Sun Park, Seoul (KR); Ji Goo Kang, Seoul (KR)

(73) Assignee: CK MATERIALS LAB CO., LTD., Seoul (KR)

(*) Notice: Subject to any disclaimer, the term of this patent is extended or adjusted under 35 U.S.C. 154(b) by 0 days.

(21) Appl. No.: 16/526,556

(22) Filed: Jul. 30, 2019

(65) Prior Publication Data

US 2019/0354187 A1    Nov. 21, 2019

Related U.S. Application Data

(63) Continuation of application No. 15/763,211, filed as application No. PCT/KR2017/005508 on May 26, 2017, now Pat. No. 10,423,230.

(30) Foreign Application Priority Data

Jun. 14, 2016 (KR) .................. 10-2016-0073949
Nov. 3, 2016 (KR) .................. 10-2016-0145620

(51) Int. Cl.
  *G06F 3/01*     (2006.01)
  *H01F 7/16*    (2006.01)
  (Continued)

(52) U.S. Cl.
  CPC .............. *G06F 3/016* (2013.01); *B06B 1/045* (2013.01); *G06F 3/01* (2013.01); *G06F 3/0338* (2013.01);
  (Continued)

(58) Field of Classification Search
  CPC .......... G06F 3/01; G06F 3/016; G06F 3/0338; G06F 3/03543
  (Continued)

(56) References Cited

U.S. PATENT DOCUMENTS 6,747,631 B1    6/2004  Sakamaki et al.
2004/0059245 A1  3/2004  Watanabe et al.
(Continued)

FOREIGN PATENT DOCUMENTS

JP    2004112937    4/2004
JP    2004118859    4/2004
(Continued)

OTHER PUBLICATIONS

International Search Report issued for corresponding Application No. PCT/KR2017/005508, dated Aug. 25, 2017, 4 pages.
(Continued)

*Primary Examiner* — Michael Pervan
(74) *Attorney, Agent, or Firm* — Stuart H. Mayer; Mayer & Williams PC

(57) ABSTRACT

One embodiment provides a multi-directional actuating module capable of moving in various directions and capable of delivering various tactile senses such as knocking or rubbing as well as vibration by controlling at least one of the intensity, direction or frequency of a magnetic field generation unit. Further, the multidirectional actuating module according to one embodiment may comprise: a moving body capable of moving in at least two or more axial directions by means of an external magnetic field; a support for supporting the moving body so as to be movable; and at least two or more magnetic field generation units which are in the form of a coil to generate the magnetic field.

17 Claims, 11 Drawing Sheets

(51) Int. Cl.
*H01F 7/14* (2006.01)
*H02K 33/16* (2006.01)
*H02K 33/00* (2006.01)
*H02K 33/02* (2006.01)
*B06B 1/04* (2006.01)
*G06F 3/0338* (2013.01)
*H01F 7/08* (2006.01)

(52) U.S. Cl.
CPC ............. *H01F 7/14* (2013.01); *H01F 7/1638* (2013.01); *H02K 33/00* (2013.01); *H02K 33/02* (2013.01); *H02K 33/16* (2013.01); *H01F 2007/086* (2013.01); *H01F 2007/1692* (2013.01)

(58) Field of Classification Search
USPC .......................... 335/266, 268; 345/157–167
See application file for complete search history.

(56) References Cited

U.S. PATENT DOCUMENTS

| | | |
|---|---|---|
| 2006/0221052 A1 | 10/2006 | Harada et al. |
| 2013/0154942 A1 | 6/2013 | Okada |
| 2013/0193779 A1 | 8/2013 | Kuroda |
| 2016/0049576 A1 | 2/2016 | Levatich |
| 2017/0090572 A1 | 3/2017 | Holenarsipur |
| 2018/0085786 A1 | 3/2018 | Songatikamas |
| 2018/0090253 A1 | 3/2018 | Songatikamas |
| 2018/0123437 A1 | 5/2018 | Khoshkava |

FOREIGN PATENT DOCUMENTS

| | | |
|---|---|---|
| JP | 2013154290 | 8/2013 |
| JP | 5789608 | 10/2015 |
| JP | 2015191465 | 11/2015 |
| KR | 1020110118584 | 10/2011 |
| KR | 101097857 | 12/2011 |
| KR | 20130001431 | 1/2013 |
| KR | 101461274 | 11/2014 |
| KR | 20150082769 | 7/2015 |
| KR | 101556970 | 10/2015 |
| KR | 20160021160 | 2/2016 |
| KR | 101603957 | 3/2016 |
| WO | 2012029633 A1 | 10/2013 |

OTHER PUBLICATIONS

Written Opinion issued for for corresponding Application No. PCT/KR2017/005508, dated Aug. 25, 2017, 4 pages.
Notice of Allowance dated Apr. 17, 2019 for U.S. Appl. No. 15/763,211, pp. 1-7.
Supplementary European Search Report for corresponding European Application No. 17813496.1, dated May 21, 2019, 11 pages.

MULTI-DIRECTIONAL ACTUATING MODULE

CROSS-REFERENCE TO RELATED APPLICATIONS

This application is a continuation of U.S. application Ser. No. 15/763,211, filed Mar. 26, 2018 entitled "MULTI-DIRECTIONAL ACTUATING MODULE", which is a National Stage Application of PCT International Application serial number PCT/KR2017/005508, filed on May 26, 2017, which claims priority to Korean Applications, Application number 10-2016-0073949, filed on Jun. 14, 2016 and Application number 10-2016-0145620, filed Nov. 3, 2016. The disclosures of the Applications referenced above are incorporated by reference herein in their entirety.

TECHNICAL FIELD

Example embodiments relate to a multi-directional actuating module to be used in a haptic device, and more particularly to, a multi-directional actuating module that includes a material including magnetic particles to provide various tactile senses based on a movement such as a multi-directional vibration associated with a moving body changing a position in response to an external magnetic field being applied.

BACKGROUND

Haptics is a technique related to touch and specifically refers to a technique that allows a user of an electronic device to feel a touch, a force, and a sense of movement through a keyboard, a mouse, a joystick, and a touch screen. In the past, visual and auditory means have been mainly used as means of exchanging information between users and electronic devices, but recently, haptic technology has been attracting attention for more specific and realistic information transmission.

In general, a haptic providing device based on the haptic technology may include an inertial actuator, a piezoelectric actuator, an electro-active polymer actuator (EAP), and an electrostatic actuator.

The inertial actuator may include an eccentric rotation motor (ERM) that vibrates using an eccentric force generated by a body of weight connected to a magnetic circuit and a linear resonant actuator (LRA) that maximizes an intensity of vibration using a resonance frequency generated by the body of weight connected to the magnetic circuit and an elastic spring.

In terms of a linear resonance actuator in the haptic providing device of the related art, there are Korean Patent Registration No. 10-1461274 (entitled: LINEAR MOTOR) and Korean Patent Laid-open Publication No. 10-2016-0021160 (entitled: SPRING AND LINEAR VIBRATION MOTOR THEREWITH).

The piezoelectric actuator may be a device that is driven in a form of a bar or a disk based on a piezoelectric element of which an external shape changes instantaneously by an electric field. In the related art, there are Korean Patent Registration No. 10-1603957 (entitled: PIEZOELECTRIC ACTUATOR, PIEZOELECTRIC VIBRATION APPARATUS AND PORTABLE TERMINAL) and Korean Patent Laid-open Publication No. 10-2011-0118584 (entitled: TRANSPARENT COMPOSITE PIEZOELECTRIC COMBINED TOUCH SENSOR AND HAPTIC ACTUATOR).

The EPA may be a device that is driven based on repetitive movements provided by attaching an electro-active polymer film to a mass. The EPA may be based on a principle that a shape of the electro-active polymer film is changed by a functional group of a polymer backbone having a specific mechanism by external electric power. In the related art, there is U.S. Patent Application Publication No. US2016/0049576 (entitled: ACTUATOR STRUCTURE AND METHOD).

In addition to the above-mentioned haptic providing device, haptic providing device using a shape memory apply, an electrostatic force, an ultrasonic wave, and the like have been developed.

However, the above-mentioned haptic providing device merely transmits a simple vibration and thus, there is a limit to transmission of emotional tactile feedbacks or complex character information.

Korean Patent Registration No. 10-1556970 (entitled: SIMULATION OF THREE DIMENSIONAL MOTION USING HAPTIC ACTUATORS) discloses a method and apparatus for simulating a three-dimensional (3D) motion using haptic actuators, which, however, is to simulate a motion of a dynamic object by "sequentially" activating or deactivating a plurality of haptic actuators in a user device based on a predetermined reference instead of implementing 3D vibration or "tactile sense" such as a sense of rubbing using a single actuator.

Accordingly, there is a desire for research on a tactile sense transmitting structure for effectively transmitting more sensitive and complex emotion and information in addition to a simple vertical vibration in order to transmit a variety of information through a tactile sense besides visual and auditory senses.

SUMMARY

An aspect provides a multi-directional actuating module that provides more sensitive tactile senses corresponding to various situations.

Another aspect provides a multi-directional actuating module that provides various tactile senses by performing a motion such as a vibration, a rotation, and/or a translation in at least one direction on a plane (an X-Y plane) as well as a Z-axial motion.

Still another aspect provides a multi-directional actuating module that transmits various tactile senses such as "tapping" or "rubbing" in addition to a vibration by controlling at least one of a frequency, a direction or an intensity in a magnetic field generator.

According to an aspect, there is provided a multi-directional actuating module including a moving body configured to move in at least two axial directions by a magnetic field of an outside, a support configured to support the moving body to be movable, and at least two magnetic field generators provided in a form of a coil to generate the magnetic field.

The support may include a support wall configured to encompass the moving body and at least one connector configured to connect the support wall and the moving body and formed of a deformable material.

The at least two magnetic field generators may be arranged above or below the moving body, and the connector may be disposed on a periphery of a side surface of the moving body.

The at least two magnetic field generators may include a first magnetic field generator disposed on a first side and a second magnetic field generator disposed on a second side opposite to the first side relative to the moving body.

The first and second magnetic field generators may be configured to generate magnetic fields of the same direction to allow the moving body to move upwardly or downwardly.

The first and second magnetic field generators may be configured to generate magnetic fields of opposite directions to allow the moving body to move toward the first side or the second side.

The connector may include a first connector disposed on the first side relative to the moving body and a second connector disposed on the second side relative to the moving body.

A distance between a center of the first magnetic field generator and a center of the second magnetic field generator may range between 90% and 110% of a length of one side of the moving body laid in a direction traversing the centers of the first and second magnetic field generators.

Coils of the first magnetic field generator and the second magnetic field generator may be formed in an ellipse or circle shape.

According to another aspect, there is also provided a haptic device including at least two magnetic field generators provided in a form of a coil to generate a magnetic field, a moving body configured to move in at least two axial directions by the magnetic field generated by the at least two magnetic field generators, a support configured to support the moving body to be movable, and a transmitter configured to transmit a tactile signal by moving together with the moving body when the moving body moves, The haptic device may include at least one connecting body configured to connect the moving body and the transmitter.

The support may include a support wall configured to encompass the moving body and a plurality of connectors configured to connect the support wall and the moving body, formed of a deformable material, and arranged symmetrically.

Based on an X-Y plane on which a zero point is a center of the moving body, the at least two magnetic field generators may include a first magnetic field generator disposed on a +Y axis based on the moving body, a second magnetic field generator disposed on a +X axis based on the moving body, a third magnetic field generator disposed on a −Y axis based on the moving body, and a fourth magnetic field generator disposed on a −X axis based on the moving body.

The second magnetic field generator and the fourth magnetic field generator may be configured to generate magnetic fields of opposite directions to allow the moving body to move in an X-axial direction, and the first magnetic field generator and the third magnetic field generator may be configured to generate magnetic fields of opposite directions to allow the moving body to move in a Y-axial direction A pair of the first magnetic field generator and the second magnetic field generator and a pair of the third magnetic field generator and the fourth magnetic field generator may be configured to generate magnetic fields of opposite directions to allow the moving body to move in a Y=X line direction, and a pair of the first magnetic field generator and the fourth magnetic field generator and a pair of the second magnetic field generator and the third magnetic field generator may be configured to generate magnetic fields of opposite directions to allow the moving body to move in a Y=−X line direction.

Based on the X-Y plane on which the zero point is the center of the moving body, the at least two magnetic field generators may include a first magnetic field generator disposed in a first quadrant based on the moving body, a second magnetic field generator disposed in a second quadrant based on the moving body, a third magnetic field generator disposed in a third quadrant based on the moving body, and a fourth magnetic field generator disposed in a fourth quadrant based on the moving body.

A pair of the first magnetic field generator and the second magnetic field generator and a pair of the third magnetic field generator and the fourth magnetic field generator may be configured to generate magnetic fields of opposite directions to allow the moving body to move in an X-axial direction, and a pair of the first magnetic field generator and the fourth magnetic field generator and a pair of the second magnetic field generator and the third magnetic field generator may be configured to generate magnetic fields of opposite directions to allow the moving body to move in a Y-axial direction.

According to an aspect, it is possible to provide a multi-directional actuating module that performs a motion in multiple directions.

According to another aspect, it is possible to provide a multi-directional actuating module that transmits various tactile senses such as "tapping" or "rubbing" in addition to a vibration by controlling at least one of a frequency, a direction or an intensity in a magnetic field generator.

BRIEF DESCRIPTION OF DRAWINGS

These and/or other aspects, features, and advantages of the invention will become apparent and more readily appreciated from the following description of example embodiments, taken in conjunction with the accompanying drawings.

DETAILED DESCRIPTION

Figure 1:
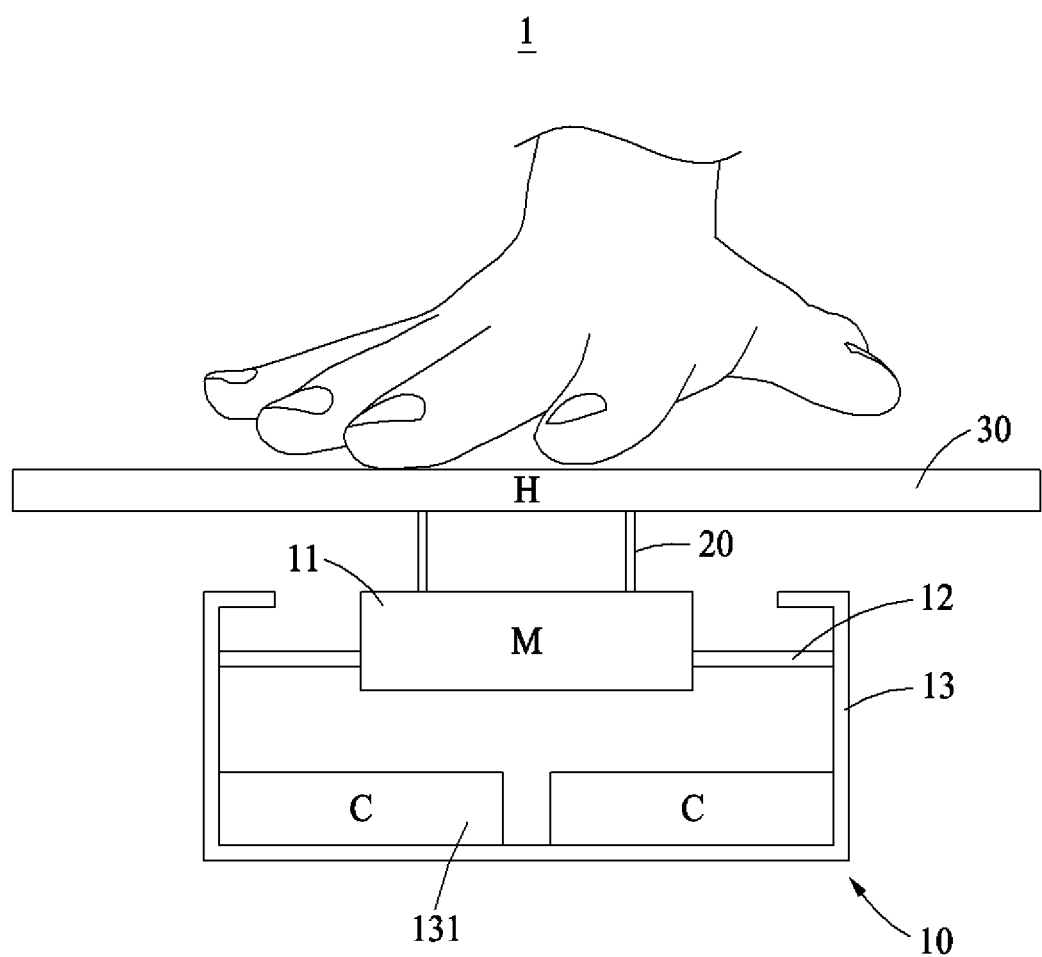
FIG. 1 is a perspective view illustrating a haptic device according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 is a perspective view illustrating a haptic device 1 according to an example embodiment.

The haptic device 1 may include a magnetic field generating module 13 configured to generate a magnetic field, a moving body 11 configured to move by the magnetic field, a support 12 configured to support the moving body 11 to be movable, and a transmitter 30 configured to transmit a tactile signal by moving together with the moving body 11 when the moving body 11 moves. The transmitter 30 may be provided in a form of, for example, a display or a glove.

Also, the haptic device 1 may include at least one connecting body 20 configured to connect the moving body 11 and the transmitter 30. The connecting body 20 may be provided in a form of, for example, a rod. The connecting body 20 may function as a medium to transfer movements such as a vibration, a rotation, and/or a translation (hereinafter, also referred to as "motion" collectively) of the moving body 11.

The moving body 11 may perform various motions as further discussed below. In an example, by a magnetic field generated when an alternating (AC) current is applied to a magnetic field generator of the magnetic field generating module 13, the moving body 11 may repetitively move in a vertical direction, which may be understood as "vibration". In another example, by a direct (DC) current consistently applied to a magnetic field generator of the magnetic field generating module 13, an angle of the moving body 11 relative to the magnetic field generating module 13 may be changed or a position of the moving body 11 relative to the magnetic field generating module 13 may be changed, which may be understood as "rotation" and "translation", respectively. The movements of the vibration, the rotation, and the translation may occur simultaneously. Such movements may also be referred to as a motion.

Figure 2:
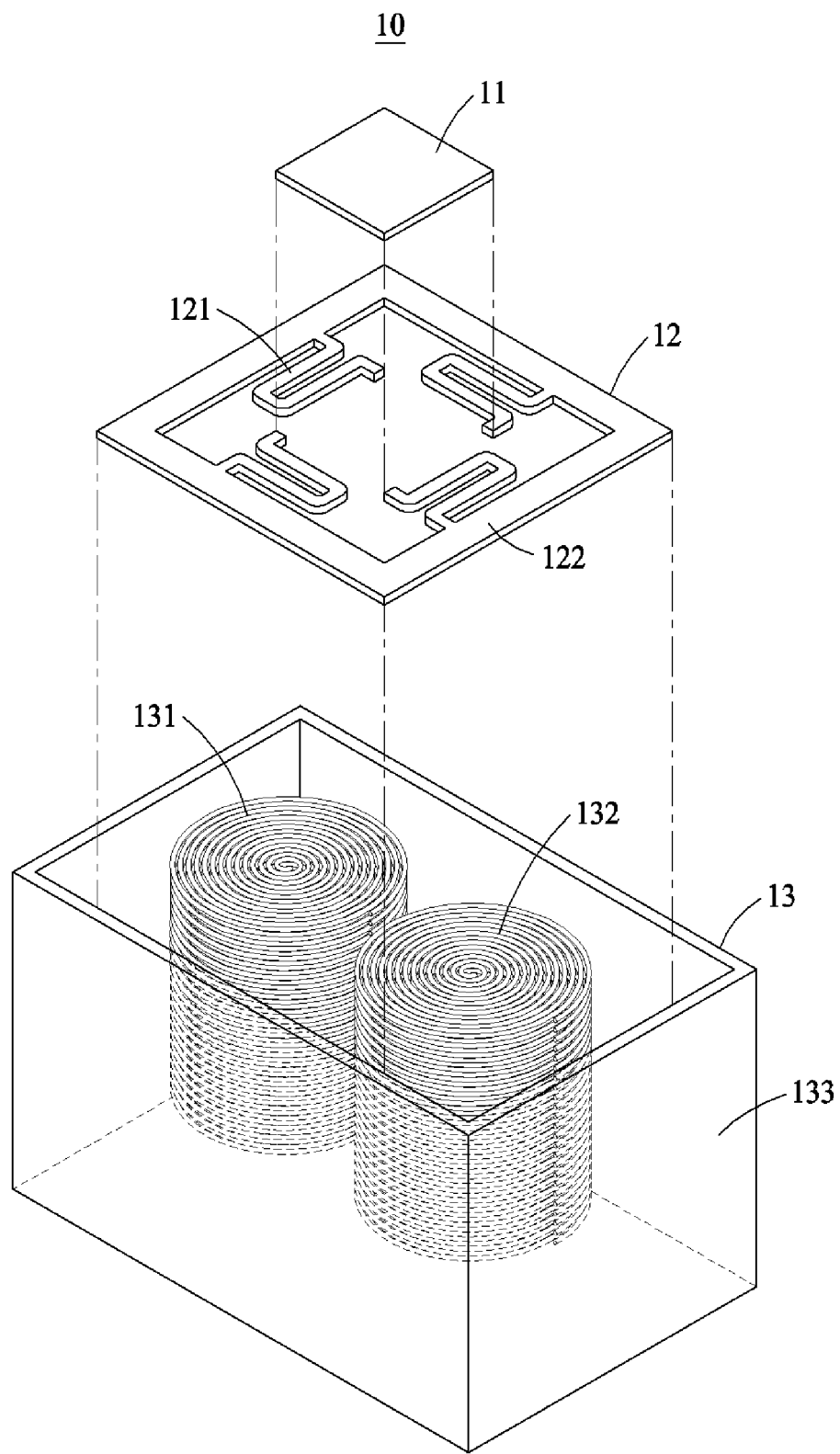
FIG. 2 is an exploded perspective view illustrating an example of an actuating module according to an example embodiment.

FIG. 2 is an exploded perspective view illustrating an example of an actuating module 10 according to an example embodiment.

The actuating module 10 may include the moving body 11 configured to move by an external magnetic field, the support 12 configured to support the moving body 11 to be movable, and the magnetic field generating module 13 provided in a form of a coil to generate a magnetic field.

The support 12 may include a support wall 122 configured to encompass the moving body 11, and at least one connector 121 configured to connect the support wall 122 and the moving body 11 and formed of a deformable material. The connector 121 may have, for example, an arm shape and an elasticity to restrict a movable range of the moving body 11 and provide a restoring force.

For example, the connector 121 may include a plurality of parallel bars in parallel to a longitudinal direction of each side of the moving body 11 and at least one connecting bar connecting the plurality of parallel bars. The plurality of parallel bars may be greater in length than the at least one connecting bar. In other words, lengths of the plurality of parallel bars may be greater than distances between the parallel bars. The connector 121 may have a shape that is bent a plurality of times as shown in the figure. One end portion of the connector 121 may be connected to one end portion of each side of the moving body 11 having a quadrangular plate shape. In the above-mentioned shape, a direction of a force transmitted through the connector 121 may be deviated from a center of gravity of the moving body 11 such that the moving body 11 performs a rotation motion and a translation motion, which may provide a tactile sense such as a sense of twisting. The connectors 121 may be arranged in point symmetry with respect to a center of the moving body 11.

The magnetic field generating module 13 may be disposed above or below the moving body 11. The connector 121 may be arranged on a periphery of a side surface of the moving body 11.

The moving body 11 may be formed of a material to react with an external magnetic field and to be magnetically polarized. The connector 121 may be formed of a matrix material having the elasticity.

The magnetic field generating module 13 may include a first magnetic field generator 131 and a second magnetic field generator 132, each provided in a form of a coil, and a case 133 configured to fix positions of the first magnetic field generator 131 and the second magnetic field generator 132 and enclose the first magnetic field generator 131 and the second magnetic field generator 132. Magnetic properties of the first magnetic field generator 131 and the second magnetic field generator 132 may be the same or different.

The moving body 11 may be formed in various shapes based on a shape of an actuator or a type of tactile sense to be transmitted. Also, the moving body 11 may be supported by at least two connectors 121.

The moving body 11 may include, for example, metal particles such as ion, ferrite, cobalt, samarium, strontium, barium, aluminum, nickel, and neodymium in nano or micron units, a polymer, plastic, or rubber material such as silicone, polyurethane, nitrile, polyethylene, and polyethylene, and combinations thereof.

The moving body 11 may be magnetized to achieve a maximum magnetic force. A magnetization may be performed in a one direction based on a coil or to achieve two poles on one face, multiple poles on one face, or multiple poles on double faces.

In FIG. 2, when the moving body 11 is magnetized, the moving body 11 may be polarized vertically based on a z-axial direction. For example, magnetic properties of an upper portion and a lower portion of the moving body 11 may be an N pole and an S pole, respectively.

A surface of the moving body 11 may be formed with a soft magnetic material such as soft iron, silicon steel, and quartz to effectively use a magnetic force. The surface of the moving body 11 may also be formed with a mixed material of soft magnetic material powder and a polymer, plastic, or rubber material such as silicone, polyurethane, nitrile, polyethylene, and polyethylene.

The connector 121 including the matrix material may change a shape in response to a motion including the vibration and the like of the moving body 11. Also, the connector 121 may increase a modulus of elasticity to reach at least a predetermined level, thereby maximizing the restoring force.

At least two connectors 121 may be provided to efficiently support the moving body 11 moving in a multi-direction based on moving directions of the moving body 11. The at least two connectors 121 may include a first connector disposed on a first side relative to the moving body 11 and a second connector disposed on a second side relative to the moving body 11.

A shape of the connector 121 may be at least one selected from a group including a straight line, a rhombus, an arm, and a combination thereof.

In an example, the connector 121 may include a rubber, a polymer material, or a silicone material. To change the modulus of elasticity, the connector 121 may include an additive agent such as an antifoaming agent, a plasticizer, a reinforcing filler, and a softener.

In another example, the connector 121 may include a rubber, a polymer material, or a silicone material. To change the modulus of elasticity, a process such as vacuum defoaming, hot curing or foaming may be performed on the connector 121.

The magnetic field generators 131 and 132 may be arranged in at least one of an upper side or a lower side of the moving body 11 and may be in a position or a shape corresponding to the moving body. Also, the magnetic field generators 131 and 132 may have the same or different magnetic properties in relation to the moving body 11 at portions in contact with the moving body 11.

A polygonal plane coil having, for example, a circle, ellipse or rectangle shape, or a solenoid coil may be used as the magnetic field generators 131 and 132. Center holes of the magnetic field generators 131 and 132 may each be hollow or include a soft magnetic core formed of a material such as soft iron, steel, and stone.

The magnetic field generators 131 and 132 may be provided as a plurality of magnetic field generators based on directions in which the moving body 11 is to move. The magnetic field generators 131 and 132 may include the first magnetic field generator 131 disposed on a first side and the second magnetic field generator 132 disposed on a second side opposite to the first side.

The magnetic field generators 131 and 132 may have the same or different magnetic properties, and a DC or AC current may be applied thereto.

The magnetic field generating module 13 may adjust a space between magnetic field generating modules, an intensity of magnetic field, and a direction of current applied to each magnetic field generating module based on a number of actuating directions, a performance, and a design of the actuating module 10.

Also, a degree of a motion including, for example, the vibration of the moving body 11 may be controlled based on a frequency, an intensity, a direction of current applied to a coil, a coil shape, a space between coils, an elasticity of a connector, a weight of the moving body 11 or a combination thereof.

Referring to FIG. 2, in the actuating module 10, two connectors, for example, the connector 121 and the support wall 122 may support the moving body 11 in a square shape in a left side and a right side of the moving body 11. Also, the two magnetic field generators 131 and 132 are arranged below the moving body 11.

Figure 6:
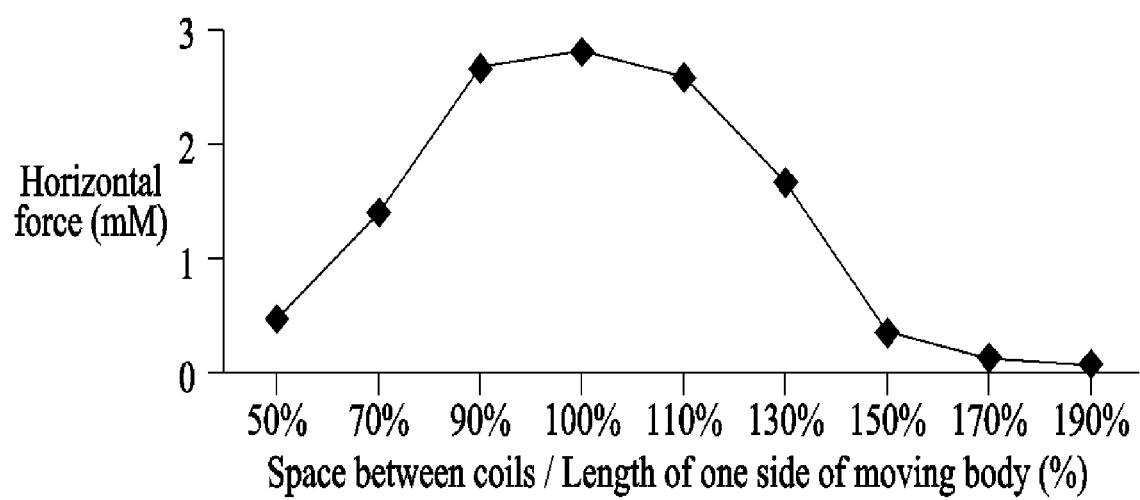
FIG. 6 is a graph illustrating an intensity of force differently applied to a moving body based on a space between magnetic field generators according to an example embodiment.

FIG. 6 is a graph illustrating an intensity of a force differently applied to a moving body based on a space between magnetic field generators according to an example embodiment.

To measure an effect exerted on an intensity of a horizontal vibrating force applied to the moving body 11 based on a space between the magnetic field generators 131 and 132, a horizontal vibrating force may be measured by slightly increasing a space between the magnetic field generators 131 and 132.

As shown in the graph, when the magnetic field generators 131 and 132 are in contact with each other, the space between the magnetic field generators 131 and 132 may be 50% of a length of one side of the moving body 11 laid in a direction traversing centers of the magnetic field generators 131 and 132. In this example, the horizontal vibrating force applied to the moving body 11 based on the magnetic field generators 131 and 132 may increase, and then decrease.

Also, it can be known from the graph that a maximum horizontal vibrating force is obtained when a distance between the centers of the magnetic field generators 131 and 132 ranges between 90% and 110% of the one side of the moving body 11 laid in the direction traversing the centers of the magnetic field generators 131 and 132.

Figure 7A:
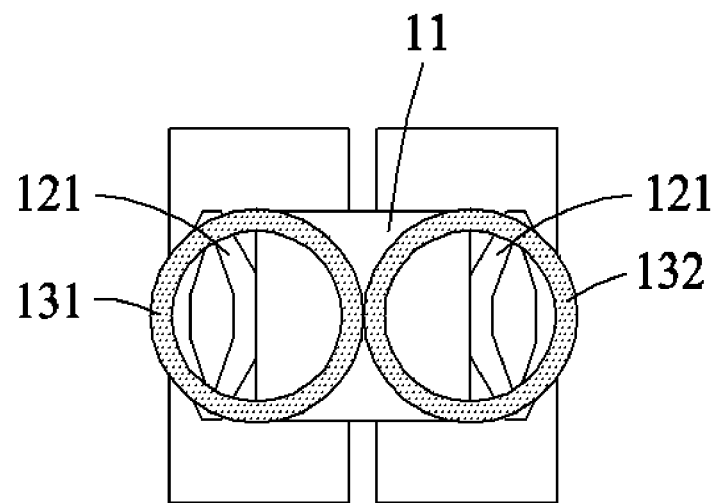
FIGS. 7A, 7B, and 7C are bottom views illustrating magnetic field generators of an actuating module in various shapes according to an example embodiment.
Figure 7B:
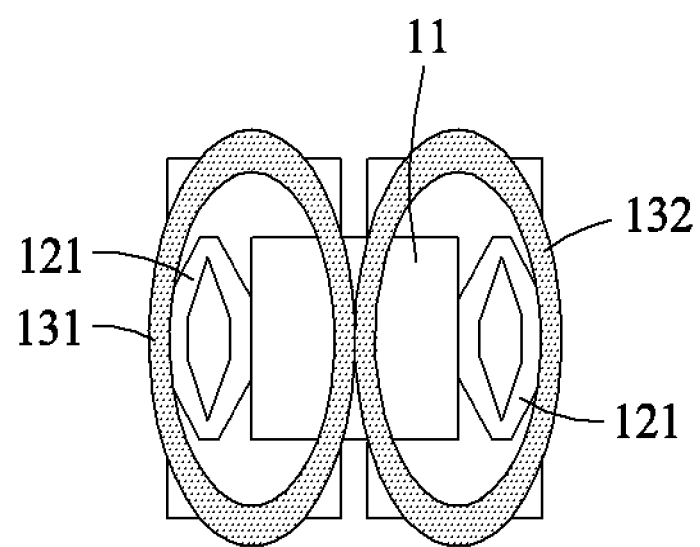
Figure 7C:
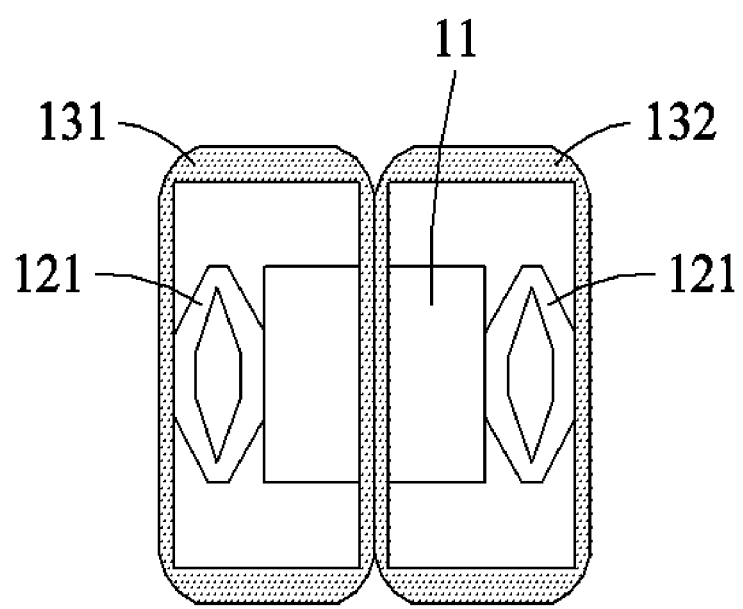

FIGS. 7A through 7C are bottom views illustrating magnetic field generators of an actuating module in various shapes according to an example embodiment.

As illustrated in FIGS. 7A through 7C, the magnetic field generators 131 and 132 may be formed in circular, elliptical, and rectangular shapes.

Figure 8:
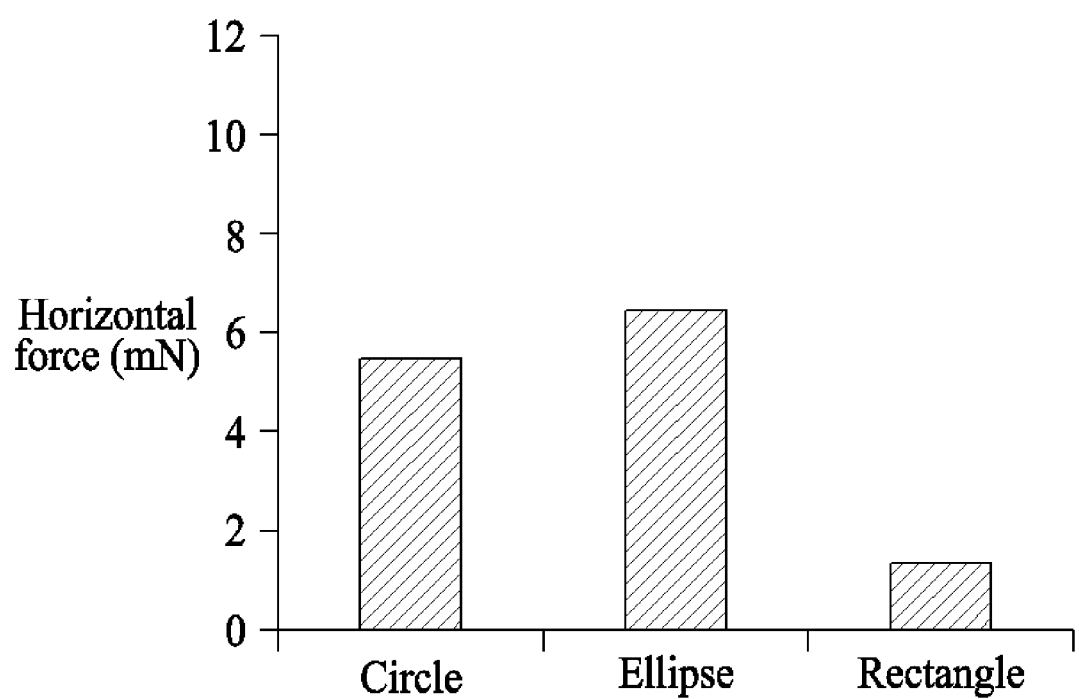
FIG. 8 is a graph illustrating an intensity of force differently applied to a moving body based on shapes of magnetic field generators according to an example embodiment.

FIG. 8 is a graph illustrating an intensity of force differently applied to a moving body based on shapes of magnetic field generators according to an example embodiment. An effect exerted on an intensity of a horizontal vibrating force applied to a moving body may be measured based on a shape of a magnetic field generator.

A horizontal vibrating force may be measured by changing a shape of the magnetic field generators 131 and 132 to circular, elliptical, and rectangular shapes. To exclude effects of factors other than the shape of the magnetic field generators 131 and 132, each of the magnetic field generators 131 and 132 may be manufactured to have the same current and the same number of turns.

As shown in the graph, a relatively high intensity of horizontal vibrating force may be obtained when the magnetic field generators 131 and 132 having the same current and the same number of turns is in the circular or elliptical shape.

Hereinafter, a motion mechanism including the vibration and the like of the actuating module 10 will be described.

Figure 3:
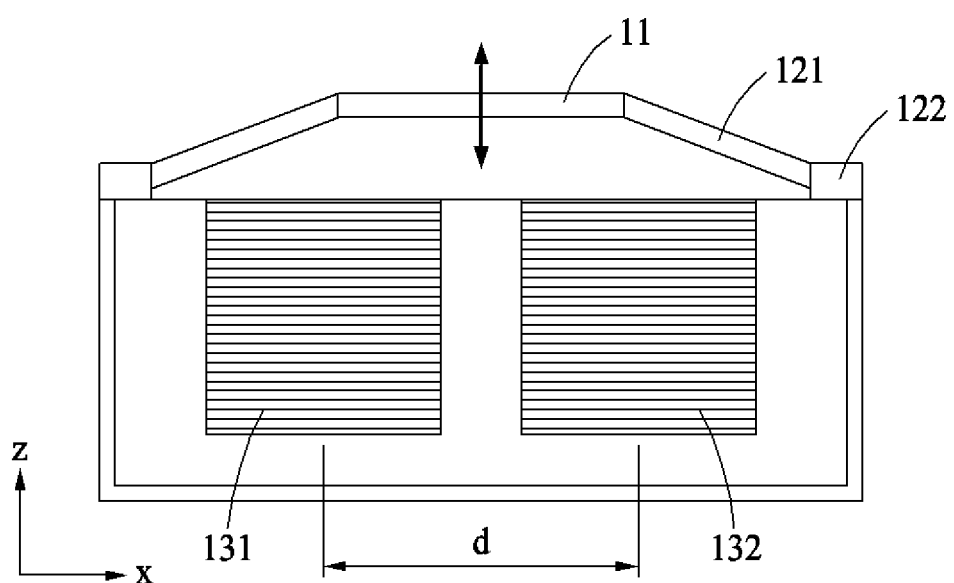
FIG. 3 is a cross-sectional view illustrating an actuating module including a moving body moving in a Z-axial direction according to an example embodiment.

FIG. 3 is a cross-sectional view illustrating the actuating module 10 including the moving body 11 moving in a Z-axial direction according to an example embodiment.

Four connectors including the connector 121 may support the moving body 11 that is vertically polarized and magnetized. Two magnetic field generators, for example, the magnetic field generators 131 and 132 may be arranged below the moving body 11.

The two magnetic field generators 131 and 132 may be configured to have the same magnetic properties. When an AC current is applied to the two magnetic field generators 131 and 132, an attractive force and a repulsive pulse may alternately generated between the moving body 11 and the magnetic field generators 131 and 132 due to the magnetic properties of the magnetic field generators 131 and 132.

In this example, the moving body 11 may perform a to-and-fro motion between a first position toward which a relative distance from the magnetic field generators 131 and 132 increases due to the repulsive force and a second position toward which a relative distance from the magnetic field generators 131 and 132 decreases due to the attractive force.

Also, in response to at least one of a frequency, a direction or an intensity of a magnetic field formed by the magnetic field generators 131 and 132 being controlled, at least one of a frequency or an intensity changing direction from the first position to the second position may be controlled, thereby generating a tactile signal of, for example, a vibration or a tapping.

Figure 4:
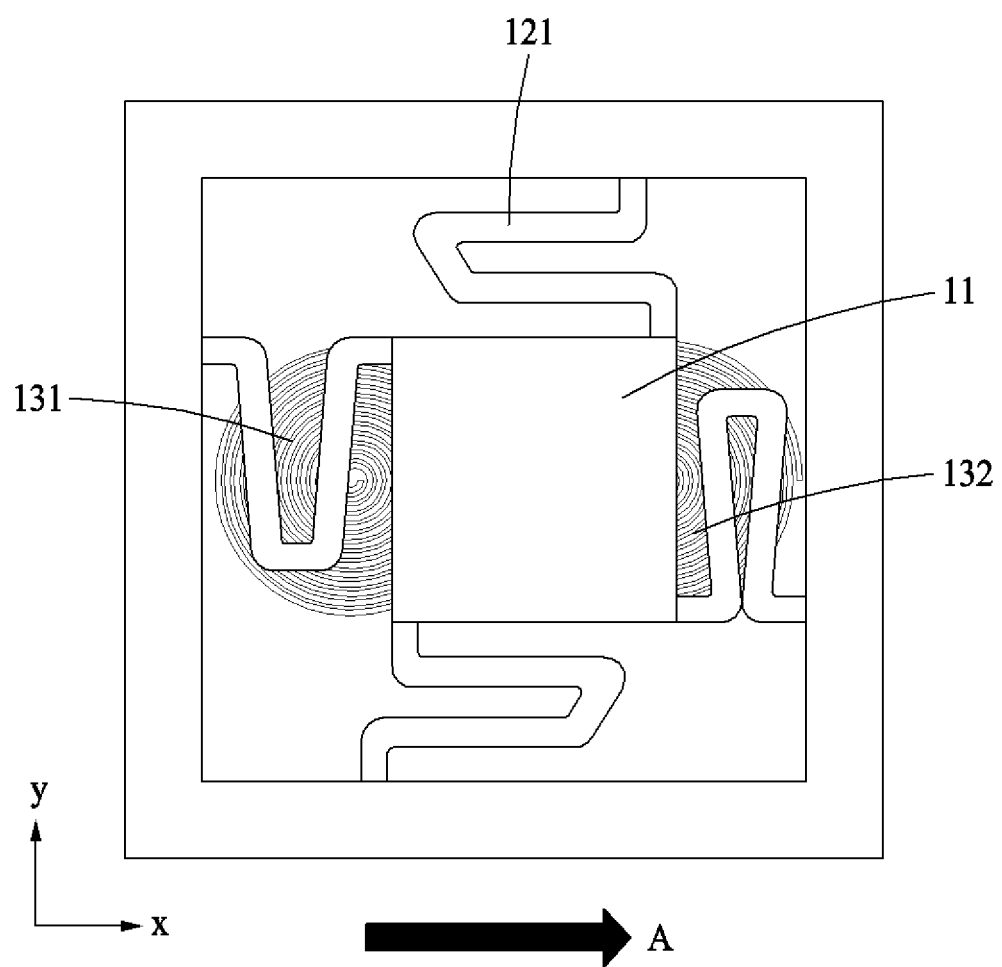
FIG. 4 is a top view illustrating an actuating module including a moving body moving in an X-axial direction according to an example embodiment.
Figure 5:
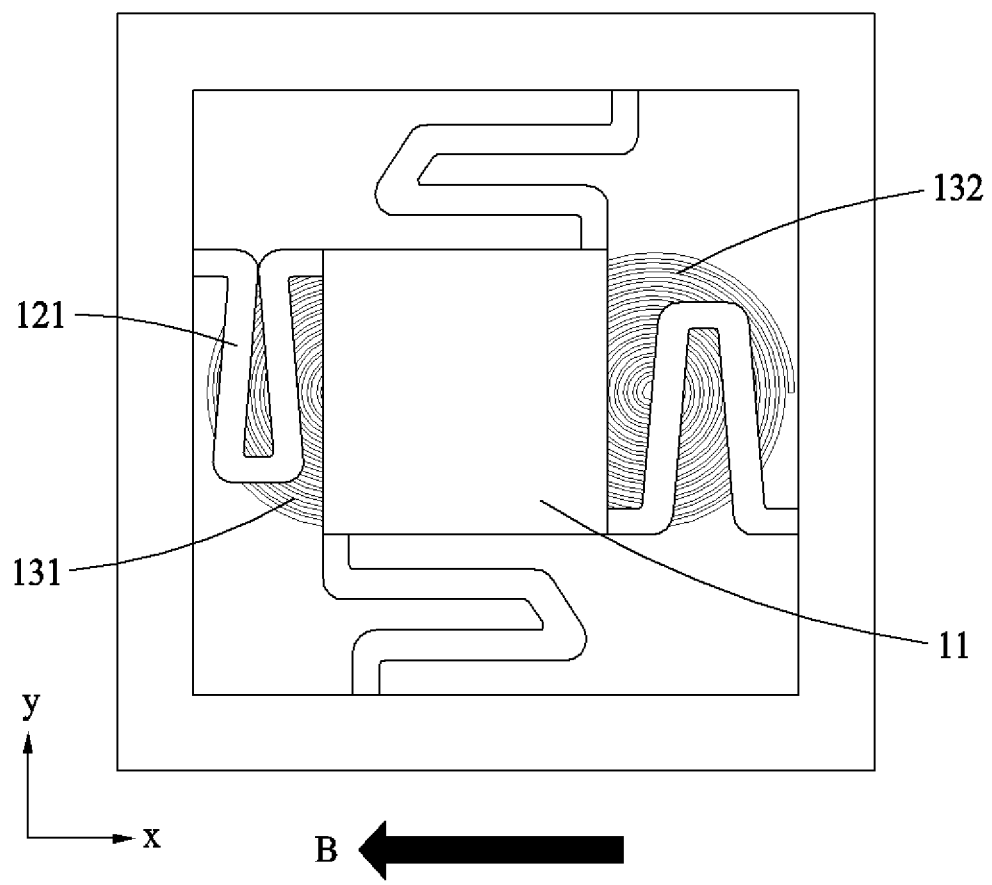
FIG. 5 is a top view illustrating an actuating module including a moving body moving in an X-axial direction according to an example embodiment.

FIGS. 4 and 5 are top views illustrating the actuating module 10 including the moving body 11 moving in an X-axial direction according to an example embodiment. An X-axis directional movement may be described with reference to FIGS. 4 and 5.

Similarly to a Z-axis directional motion, four connectors including the connector 121 may support the moving body 11 that is vertically polarized and magnetized. Also, the two magnetic field generators 131 and 132 may be arranged to be adjacent to a bottom of the moving body 11.

Unlike the Z-axis directional motion, the two magnetic field generators 131 and 132 may be configured to have different magnetic properties, and an AC current may be applied to the two magnetic field generators 131 and 132.

As illustrated in FIG. 4, in terms of the two magnetic field generators, a repulsive force may be generated in an area adjacent to the first magnetic field generator 131 and the moving body 11 and an attractive force may be generated at a face of the moving body contacting the second magnetic field generator 132, whereby an X-axis directional motion from the first magnetic field generator 131 to the second magnetic field generator 132 occurs.

Thereafter, when opposite directional currents are applied to the two magnetic field generators 131 and 132, the first magnetic field generator 131 and the second magnetic field generator 132 may be reversed in magnetic property in a vicinity of the moving body 11.

Accordingly, as illustrated in FIG. 5, the attractive force may be generated in an adjacent area of the moving body 11 and the first magnetic field generator 131, and the repulsive force may be generated in an adjacent area of the moving body and the second magnetic field generator 132.

In the moving body 11, a motion of a direction from the first magnetic field generator 131 to the second magnetic field generator 132 may be switched to a motion of a direction from the second magnetic field generator 132 to the first magnetic field generator 131. When the switching is repeated, a to-and-fro motion of an X-axial direction may be implemented. For example, by applying the AC current to the first magnetic field generator 131 and the second magnetic field generator 132, the to-and-fro motion of the X-axial direction may be implemented.

Also, in response to at least one of a frequency, a direction or an intensity of a magnetic field formed by the magnetic field generators 131 and 132 being controlled, at least one of a frequency or an intensity changing direction between a coil of the first magnetic field generator 131 and a coil of the second magnetic field generator 132 may be controlled, thereby generating a tactile signal of, for example, an X-axial directional vibration or tapping.

Figure 9:
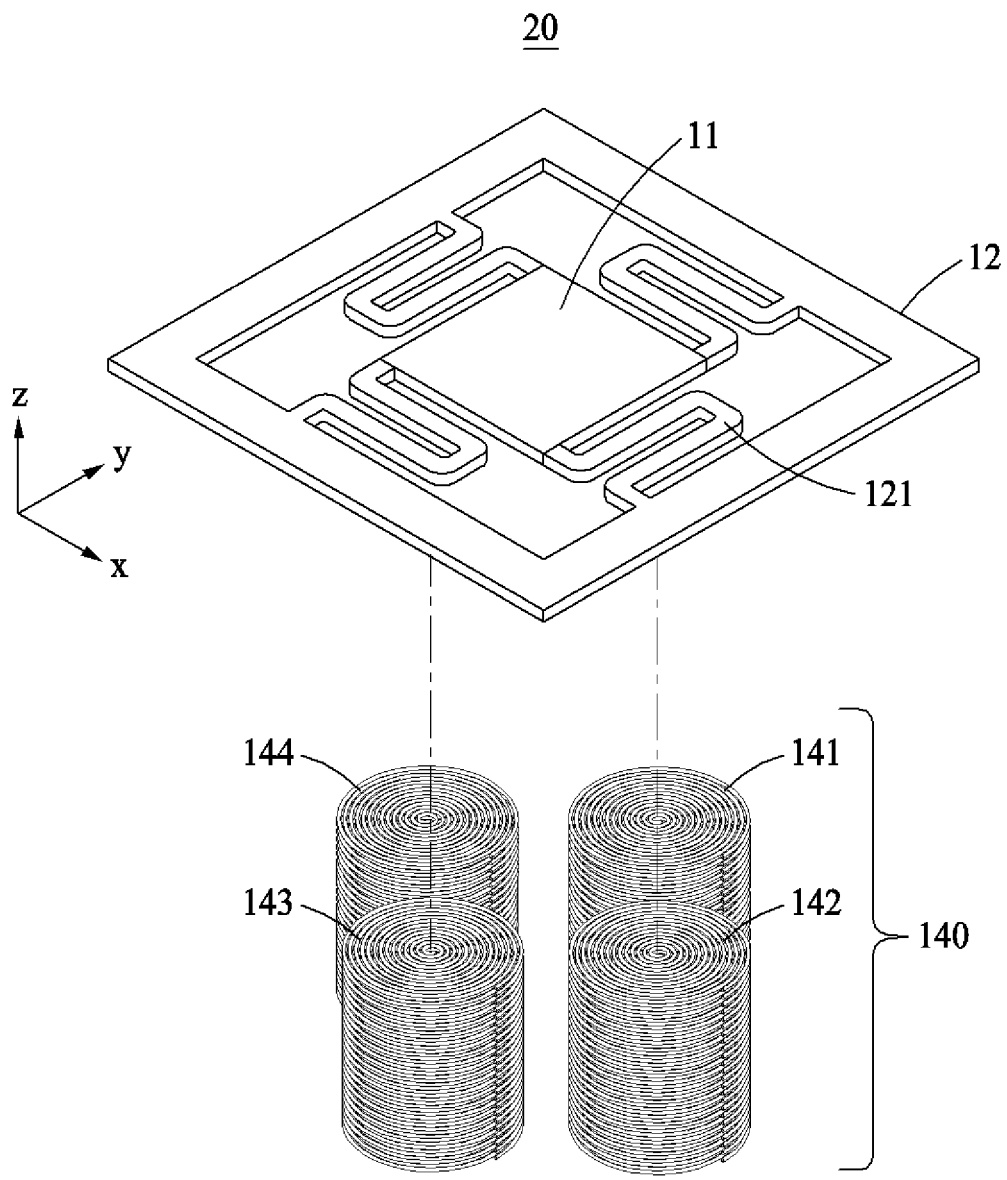
FIG. 9 is an exploded perspective view illustrating another example of an actuating module according to an example embodiment.
Figure 10:
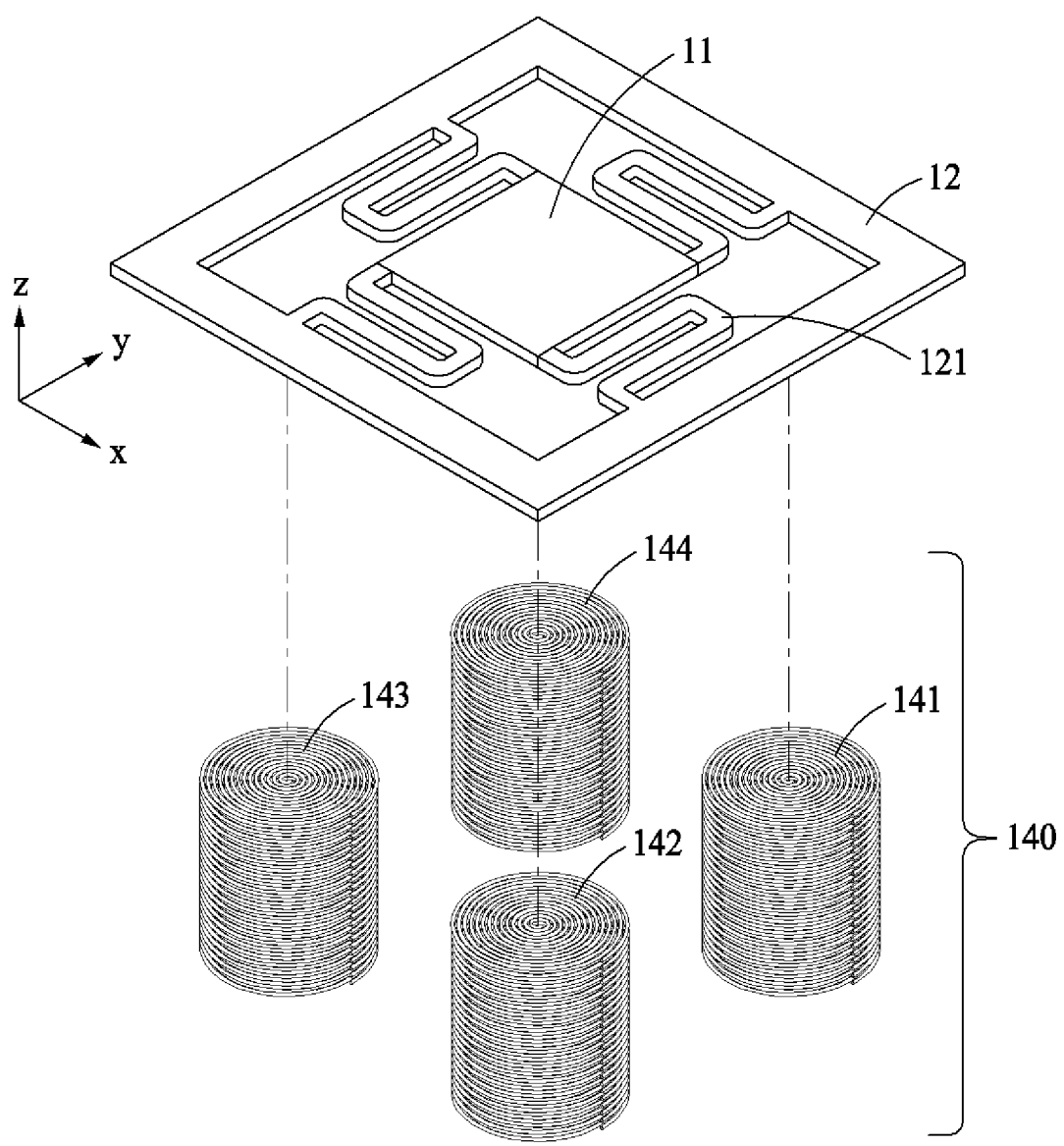
FIG. 10 is an exploded perspective view illustrating still another example of an actuating module according to an example embodiment.

FIGS. 9 and 10 illustrate actuating modules 20 and 30 configured to move in three directions according to a second example embodiment and a third example embodiment.

Similarly to a 2-directional actuating module, four connectors including the connector 121 may support the moving body 11 that is vertically polarized and magnetized. Also, four magnetic field generators, for example, a first magnetic field generator 141, a second magnetic field generator 142, a third magnetic field generator 143, and a fourth magnetic field generator 144 may be arranged to be adjacent to a bottom of the moving body 11. The four magnetic field generators 141, 142, 143, and 144 may be configured as a magnetic field generator set 140.

The magnetic field generator set 140 may include the first magnetic field generator 141, the second magnetic field generator 142, the third magnetic field generator 143, and the fourth magnetic field generator 144.

The four magnetic field generators 141, 142, 143, and 144 may be arranged in a quadrangular form (as shown in FIG. 9) or in a cross form (as shown in FIG. 10).

In FIG. 9, the first magnetic field generator 141 may be disposed on a +Y axis, the second magnetic field generator 142 may be disposed on a +X axis, the third magnetic field generator 143 may be disposed on a −Y axis, and the fourth magnetic field generator 144 may be disposed on a −X axis.

In FIG. 10, the first magnetic field generator 141 may be disposed in a first quadrant, the second magnetic field generator 142 may be disposed in a fourth quadrant, the third magnetic field generator 143 may be disposed in a third quadrant, and the fourth magnetic field generator 144 may be disposed in a second quadrant.

The following description will be based on the quadrangular-form arrangement corresponding to FIG. 9.

Similarly to the aforementioned 2-directional actuating module, to allow the moving body 11 to move in the Z-axial direction, the four magnetic field generators 141, 142, 143, and 144 may be configured to have the same magnetic properties. When an AC current is applied to the magnetic field generators, an attractive force and a repulsive pulse may alternately generated between the four magnetic field generators 141, 142, 143, and 144 and the moving body 11 located adjacent thereto.

When two magnetic field generators are used for the Z-axis directional motion, it is appropriate to use the first and third magnetic field generators or the second and fourth magnetic field generators 142 and 144 so as to be balanced.

The moving body 11 may perform a to-and-fro motion between a first position toward which a relative distance from the magnetic field generator set 140 increases due to the repulsive force and a second position toward which a relative distance from the magnetic field generator set 140 decreases due to the attractive force.

Also, in response to at least one of a frequency, a direction or an intensity of a magnetic field formed by from the magnetic field generator set 140 being controlled, at least one of a frequency or an intensity changing direction from the first position to the second position may be controlled, thereby generating a tactile signal of, for example, a vibration and a tapping.

Hereinafter, a Z-axis directional partial motion of the moving body 11 will be described.

The AC current may be applied to the first magnetic field generator 141. A DC current may be applied to the second, third, and fourth magnetic field generators 142, 143 and 144 such that the second, third, and fourth magnetic field generators 142, 143 and 144 have magnetic properties opposite to that of the moving body 11.

In this example, when the AC current is applied to the first magnetic field generator 141, the attractive force and the repulsive pulse may alternately generated between the moving body 11 and the first magnetic field generator 141. Also, the attractive force may be continuously generated between the second, third, and fourth magnetic field generators 142, 143 and 144 and the moving body 11.

Due to the attractive force relative to the second, third, and fourth magnetic field generators 142, 143 and 144, a distance between the moving body 11 and the first magnetic field generator may decrease. By the AC current applied to the first magnetic field generator, the attractive force and the repulsive force may be alternately generated in an area between the first magnetic field generator and a portion of the moving body 11 adjacent to the first magnetic field generator. Through this, the portion of the moving body 11 adjacent to the first magnetic field generator 141 may perform the to-and-fro motion in the Z-axial direction.

When compared to the Z-axis directional motion in which the motion occurs in a center portion of the moving body 11 in the 2-directional actuating module, a partial vibrating sense may be provided from a vibration source biased to the first magnetic field generator in a diagonal direction.

Similarly, the AC current may be applied to the second magnetic field generator 142 and the DC current may be applied to the first, third, and fourth magnetic field generators 141 143 and 144 such that to the first, third, and fourth magnetic field generators 141, 143 and 144 have a magnetic property opposite to that of the moving body 11. In this example, when the AC current is applied, the attractive force and the repulsive pulse may alternately generated between the second magnetic field generator 142 and a portion of the moving body 11 adjacent to between the second magnetic field generator 142. Also, the attractive force may be continuously generated with respect to the first, third, and fourth magnetic field generators 141, 143 and 144.

Likewise, the Z-axis directional motion may occur in a desired portion of the moving body 11 when the AC current is applied to the third magnetic field generator 143 or the fourth magnetic field generator 144, and the DC current is applied to remaining magnetic field generators to have the magnetic property opposite to that of the moving body 11.

Also, the Z-axis directional motion may occur in a desired portion of the moving body 11 when the AC current is applied to two neighboring magnetic field generators among a plurality of magnetic field generators, and the DC current is applied to remaining magnetic field generators to have the magnetic property opposite to that of the moving body 11.

Hereinafter, the X-axis directional partial motion of the moving body 11 associated with the actuating modules 20 and 30 will be described with reference to FIGS. 9 and 10.

When implementing the X-axis directional motion using magnetic field generators arranged as illustrated in FIG. 9, the first and second magnetic field generators 141 and 142 may be provided as a pair, and the third and fourth magnetic field generators 143 and 144 may be provided as a pair. In this example, the corresponding magnetic field generators in the pair may be magnetized with each other.

The moving body 11 may receive the attractive force and the repulsive force from the first and second magnetic field generators 141 and 142 and receive the repulsive force and the attractive force from the third and fourth magnetic field generators 143 and 144, alternately. Through this, the moving body 11 may perform a motion in the X-axial direction which is a direction corresponding to a vector sum thereof.

When magnetic field generators are arranged as illustrated in FIG. 10, the X-axis directional motion may be implemented using only the second and fourth magnetic field generators 142 and 144.

A specific motion mechanism may be the same as the mechanism of the X-axis directional motion in a first example embodiment except for a magnetic field generator to be used.

Hereinafter, a Y-axis directional motion of the moving body 11 associated with the actuating modules 20 and 30 will be described with reference to FIGS. 9 and 10.

When implementing the Y-axis directional motion using magnetic field generators arranged as illustrated in FIG. 9, the first and fourth magnetic field generators 141 and 144 may be provided as a pair and the second and third magnetic field generators 142 and 143 may be provided as a pair. In this example, each of the pairs may have the same magnetic property.

The moving body 11 may receive the attractive force and the repulsive force from the first and fourth magnetic field generators 141 and 144 and receive the repulsive force and the attractive force from the second and third magnetic field generators 142 and 143, alternately. Through this, the moving body 11 may perform a motion in a Y-axial direction which is a direction corresponding to a vector sum thereof.

When implementing the Y-axis directional motion using magnetic field generators arranged as illustrated in FIG. 10, the Y-axis directional motion may be implemented using only the first and third magnetic field generators 141 and 143.

A specific motion mechanism may be the same as the mechanism of the X-axis directional motion of the actuating module 10 including two magnetic field generators except for a number of magnetic field generators to be used.

Hereinafter, a diagonal motion of the moving body 11 associated with the actuating modules 20 and 30 will be described with reference to FIGS. 9 and 10.

In a coordinate system, to allow the moving body 11 to move in a Y=X line direction, the first magnetic field generator 141 and the third magnetic field generator 143 may be used based on the actuating module 30 of FIG. 10.

Specifically, when a current is applied to the first and third magnetic field generators 141 and 143 to have opposite magnetic properties, the attractive force may be generated between the first magnetic field generator 141 and the moving body 11 and the repulsive force may be generated between the third magnetic field generator 143 and the moving body 11.

The moving body 11 may receive the attractive force from the first magnetic field generator 141 and receive the repulsive force from the third magnetic field generator 143, thereby moving in a direction corresponding to a vector sum thereof.

Thereafter, the AC current may be applied to the four magnetic field generators 141, 142, 143, and 144. Thus, the magnetic properties of the magnetic field generators 141, 142, 143, and 144 may be changed at portions adjacent to the moving body 11.

By the AC current applied to each of the magnetic field generators 141, 142, 143, and 144, the moving body 11 may repetitively perform the diagonal motion. Through this, a Y=X line directional motion of the moving body 11 may be implemented.

Hereinafter, a Y=−X line directional motion of the moving body 11 associated with the actuating modules 20 and 30 will be described with reference to FIGS. 9 and 10.

In a coordinate system, to allow the moving body 11 to move in a Y=−X line direction, the second magnetic field generator 142 and the fourth magnetic field generator 144 may be used based on the actuating module 30 of FIG. 10. When compared to an actuation scheme of the Y=X line directional motion, the same mechanism may be applied to a Y=−X line directional motion except for a different magnetic field generator to be used in a diagonal direction.

The Y=X line directional motion and the Y=−X line directional motion may be implemented using the actuating module 20 of FIG. 9. In this example, the actuating module 20 may operate using a pair of two magnetic field generators.

To implement the Y=X line directional motion, the first magnetic field generator 141 and the second magnetic field generator 142 may be provided as a pair, and the third magnetic field generator 143 and the fourth magnetic field generator 144 may be provided as a pair. A current may be applied to each of the pairs such that the corresponding magnetic field generators have the same magnetic property.

Different pairs may need to be controlled to have opposite magnetic properties.

In this example, the attractive force may be generated between the moving body 11 and the first and second magnetic field generators 141 and 142, and the repulsive force may be generated between the moving body 11 and the third and the fourth magnetic force generators 143 and 144.

The moving body 11 may simultaneously receive the attractive force from the first and second magnetic field generators 141 and 142 and simultaneously receive the repulsive force from and the third and the fourth magnetic force generators 143 and 144, thereby moving in a direction corresponding to a vector sum thereof.

Thereafter, the AC current may be applied to the four magnetic field generators 141, 142, 143, and 144. Thus, the magnetic properties of the magnetic field generators 141, 142, 143, and 144 may be changed at portions adjacent to the moving body 11.

By the AC current applied to each of the magnetic field generators 141, 142, 143, and 144, the moving body 11 may repetitively perform the motion. Through this, the Y=X line directional motion may be implemented.

Conversely, to implement the Y=−X line directional motion, the first and fourth magnetic field generators 141 and 144 may be provided as a pair, and the second and third magnetic field generator 142 and 143 may be provided as a pair.

To implement a motion of the multi-directional actuating module in an additional direction, a plurality of magnetic field generators may be arranged along a circumference of a virtual circle that shares a center with a center of an actuator. In this example, a number of the magnetic field generators may correspond to a number of directions in which the multi-directional actuating module is to move.

Also, an external current may be applied to the magnetic field generators 131 and 132 in a form of, for example, a rectangular wave, a pulse wave, or a sine wave. Using different input waveforms, the actuating module may provide different tactile senses to a user.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A haptic device comprising:
   at least two magnetic field generators configured to generate a magnetic field;
   a moving body configured to move three-dimensionally by the magnetic field generated by the at least two magnetic field generators, the moving body including magnetic particles;
   a support configured to support the moving body to be movable; and
   a controller configured to provide tactile senses comprising at least one of tapping, rubbing or twisting in addition to a vibration by controlling at least one of a frequency, a direction or an intensity of currents which applied to the at least two magnetic field generators.

2. The haptic device of claim 1, wherein the support comprising:
   a support wall configured to encompass the moving body; and
   at least one connector configured to connect the support wall and the moving body and formed of a deformable material.

3. The haptic device of claim 2, wherein the at least two magnetic field generators are arranged above or below the moving body, and
   the connector is disposed on a periphery of a side surface of the moving body.

4. The haptic device of claim 3, wherein the at least two magnetic field generators comprising:
   a first magnetic field generator disposed on a first side; and
   a second magnetic field generator disposed on a second side opposite to the first side relative to the moving body.

5. The haptic device of claim 4, wherein the connector comprises:
   a first connector disposed on the first side relative to the moving body; and
   a second connector disposed on the second side relative to the moving body.

6. The haptic device of claim 4, wherein a distance between a center of the first magnetic field generator and a center of the second magnetic field generator ranges between 90% and 110% of a length of one side of the moving body laid in a direction traversing the centers of the first and second magnetic field generators.

7. The haptic device of claim 4, wherein coils of the first magnetic field generator and the second magnetic field generator are formed in an ellipse or circle shape.

8. The haptic device of claim 2, wherein, based on an X-Y plane on which a zero point is a center of the moving body, the at least two magnetic field generators comprise:
   a first magnetic field generator disposed on a +Y axis based on the moving body;
   a second magnetic field generator disposed on a +X axis based on the moving body;
   a third magnetic field generator disposed on a −Y axis based on the moving body; and a fourth magnetic field generator disposed on a −X axis based on the moving body.

9. The haptic device of claim 8, wherein the second magnetic field generator and the fourth magnetic field generator are configured to generate magnetic fields of opposite directions to allow the moving body to move in an X-axial direction, and
the first magnetic field generator and the third magnetic field generator are configured to generate magnetic fields of opposite directions to allow the moving body to move in a Y-axial direction.

10. The haptic device of claim 8, wherein a pair of the first magnetic field generator and the second magnetic field generator and a pair of the third magnetic field generator and the fourth magnetic field generator are configured to generate magnetic fields of opposite directions to allow the moving body to move in a Y=X line direction, and
a pair of the first magnetic field generator and the fourth magnetic field generator and a pair of the second magnetic field generator and the third magnetic field generator are configured to generate magnetic fields of opposite directions to allow the moving body to move in a Y=−X line direction.

11. The haptic device of claim 2, wherein, based on the X-Y plane on which the zero point is the center of the moving body, the at least two magnetic field generators comprise:
a first magnetic field generator disposed in a first quadrant based on the moving body;
a second magnetic field generator disposed in a second quadrant based on the moving body;
a third magnetic field generator disposed in a third quadrant based on the moving body; and
a fourth magnetic field generator disposed in a fourth quadrant based on the moving body.

12. The haptic device of claim 11, wherein a pair of the first magnetic field generator and the second magnetic field generator and a pair of the third magnetic field generator and the fourth magnetic field generator are configured to generate magnetic fields of opposite directions to allow the moving body to move in an X-axial direction, and
a pair of the first magnetic field generator and the fourth magnetic field generator and a pair of the second magnetic field generator and the third magnetic field generator are configured to generate magnetic fields of opposite directions to allow the moving body to move in a Y-axial direction.

13. A haptic device comprising:
a plurality of magnetic field generators configured to generate a magnetic field;
a moving body configured to move three-dimensionally by the magnetic field generated by the plurality of the magnetic field generators, the moving body including magnetic particles;
a support configured to support the moving body to be movable; and
a controller configured to provide at least one tactile sense which includes vibration, tapping, rubbing or twisting by applying a first current to a first magnetic field generator of the plurality of the magnetic field generators and a second current which is not same as the first current to a second magnetic field generator of the plurality of the magnetic field generators.

14. The haptic device of claim 13, wherein the first current is an alternating current, and the second current is a direct current.

15. The haptic device of claim 13, wherein, the plurality of magnetic field generators comprises a first magnetic field generator, a second magnetic field generator, a third magnetic field generator, and a fourth magnetic field generator, and
wherein the four magnetic field generators are disposed separately in different directions based on the center of the moving body.

16. The haptic device of claim 15, wherein the controller is configured to apply an alternating current to the first magnetic field generator, and
wherein the controller is configured to apply, to the second, the third, and the fourth magnetic field generators, direct currents that allow the second, the third, and the fourth magnetic field generators to provide a repulsive force to the moving body.

17. The haptic device of claim 15, wherein the controller is configured to apply alternating currents to the first and the fourth magnetic field generators, and
wherein the controller is configured to apply, to the second and the third magnetic field generators, direct currents that allow the second and the third magnetic field generators to provide a repulsive force to the moving body.

* * * * *